United States Patent Office 3,455,198
Patented July 15, 1969

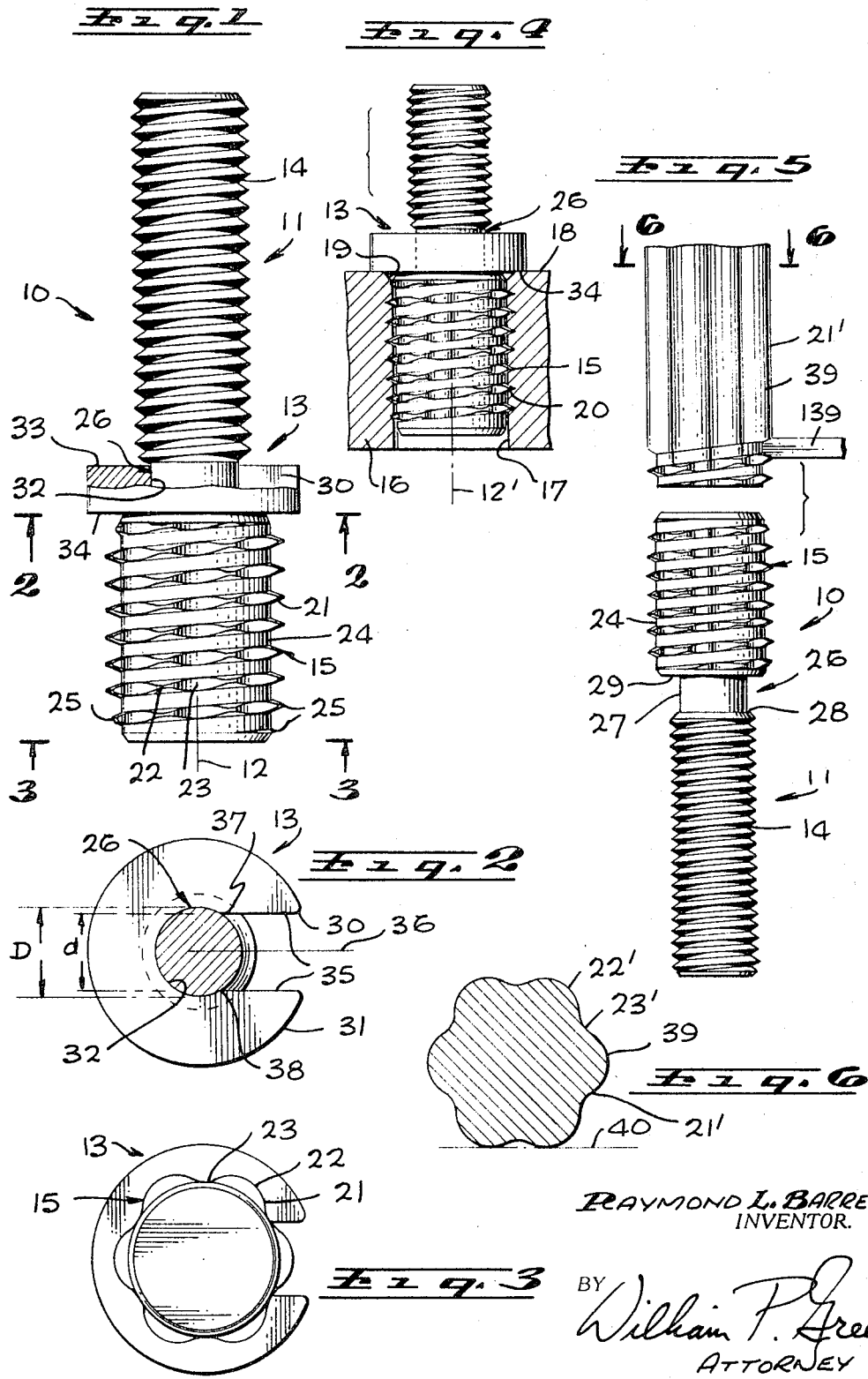

3,455,198
STRUCTURE AND FORMATION OF THREADED
STUD HAVING STOP ELEMENT
Raymond L. Barrett, Costa Mesa, Calif., assignor to
Newton Insert Co., Los Angeles, Calif., a corporation of California
Filed Oct. 11, 1967, Ser. No. 674,543
Int. Cl. F16b 35/00
U.S. Cl. 85—1                                           3 Claims

ABSTRACT OF THE DISCLOSURE

A threaded stud including an elongated body having two series of threads for connection to two different internally threaded parts, and having a stop element formed separately from the body but connected thereto at a location intermediate the two series of threads, and constructed to engage a mating part in a relation limiting the extent to which the stud can be screwed thereinto. One of the series of threads desirably has a non-circular peripheral configuration giving it a self tapping and self locking characteristic. The stud is formed from stock having a corresponding noncircular cross section, so that the self tapping and self locking threads will be given their desired cross section by merely externally threading the stock. The stop element preferably is a C-shaped part received partially within and projecting outwardly from a groove formed in the body of the stud intermediate the two series of threads.

Background of the invention

This invention relates to the structure of, and method of forming, a unique threaded stud to be utilized as a fastener for securing together two parts which are threadedly connectible to the stud.

In utilizing many conventional types of threaded stud, it is often difficult to accurately predetermine the extent to which the stud is to be screwed into a mating part, with the result that either too many or too few of the threads of the stud may engage that part, so that one of the two elements which is connected to the stud may be improperly engaged or retained. Further, it may be extremely inconvenient or impractical for a user, in every instance, to measure the extent of projection of the stud from a carrier part or the like, or to employ a special setting tool or other equipment capable of assuring proper setting of the stud.

Summary of the invention

A stud constructed in accordance with the present invention has two series of threads near its opposite ends, for connection to two different mating parts, and has a stop element formed separately from the body of the stud but connected thereto, and constructed to engage a carrier part or other element to limit the extent to which one of the series of threads is screwed into that element. The stop element is desirably disposed about the body of the stud, at a location intermediate the two series of threads, and is partially received within and projects radially outwardly from a groove in the stud. For best results, the stop element is a C-shaped part, having an opening in one side of the thread enabling the stop element to be slipped laterally or transversely onto the body and into the groove.

The body of the insert may be formed from stock of externally non-circular cross section, to give to one of the series of threads a corresponding non-circular cross section enabling the threads to function as self tapping and self locking threads. When the threads are formed in this manner, the provision of a separately formed stop element enables that stop element to project laterally or radially outwardly farther than the outer surface of the initial stock, and thus to a diameter serving effectively the desired stopping function.

Brief description of the drawing

The above and other features and objects of the invention will be better understood from the following detailed description of the typical embodiment illustrated in the accompanying drawing, in which:

FIG. 1 is a side view, partially broken away, of a stud assembly constructed in accordance with the invention;

FIG. 2 is a transverse section taken on line 2—2 of FIG. 1;

FIG. 3 is an end view taken on line 3—3 of FIG. 1;

FIG. 4 shows the stud assembly of FIG. 1 in its installed position within a carrier part;

FIG. 5 shows somewhat diagrammatically the method of forming a stud in accordance with the present invention; and FIG. 6 is a transverse section takn on line 6—6 of FIG. 5, through the non-circular stock from which the body of the stud is formed.

Description of the preferred embodiment

In FIG. 1, I have illustrated at 10 a stud constructed in accordance with the invention, and consisting of an elongated stud body 11 having an axis 12, and a stop element 13 carried by the stud. Above the stop element, the stud 11 has a first series of external threads 14, centered about axis 12, and adapted to threadedly engage a nut or other coacting internally threaded part. These threads may be of standard configuration, having major and minor diameters which remain uniform as they advance circularly about the stud.

Beneath or at the second axial side of stop element 13, the stud body 11 has a second series of external threads 15, which are adapted to be conncted into another coacting part, such as the carrier part represented at 16 in FIG. 4. This carrier part may initially contain an unthreaded passage or bore having a cylindrical side wall 17, centered about an axis 12' which coincides with the axis 12 of stud body 11 in the FIG. 4 installed position of the stud. The upper or axially outer surface 18 of the carrier part may be planar and disposed transversely of axis 12', with an annular frusto-conical tapering countersink surface 19, centered about axis 12', being formed in the carrier part at the axially outer end of cylindrical bore wall 17.

Threads 15 at the lower or axially inner end of stud body 11 are desirably of a configuration giving these threads a self tapping and self locking characteristic, so that these threads form their own mating threads 20 in bore wall 17 of carrier part 16 during advancement downwardly to the FIG. 4 position in the carrier part, and additionally so that the threads 15 will, after installation to the FIG. 4 setting, automatically resist unscrewing movement of threads 15 from the carrier part, and thus lock the stud in the FIG. 4 position. In order to accomplish these results, threads 15 may be of the self tapping and self locking type disclosed and claimed in United States Patent Number 3,200,691, issued to Robert Neuschotz Aug. 17, 1965, on "Threaded Elements With Self-Tapping Peaks And Recesses." More particularly, threads 15 desirably have the alternately peaked and recessed external configuration illustrated in FIG. 3, in which the outer surfaces 21 of the threads are illustrated as having circularly spaced maximum radius peak portions 22 and intermediate circularly spaced minimum radius portions 23. In extending from one of the minimum radius portions 23 to the next successive minimum radius location, the outer surface 21 of a particular turn of the threads 15 advances progressively in radius to a location 22, and then progressively decreases in radius to the next successive minimum radius or recessed valley location 23, and at rates giving the peaks the radially outwardly convex peripheral configuration illustrated in FIG. 3. Axially between successive turns of threads 15, the outer surface of the stud forms modified minor diameter surfaces 24, which extend axially and cylindrically (about axis 12) through a distance greater than the axial length of the usual minor diameter surface of a completely standard thread. At the lower or axially inner end threads 15, these threads may be further truncated by chamfering them frusto-conically at 25, annularly about axis 12, as discussed in the above identified Neuschotz Patent.

Axially between the two sets of threads 14 and 15, body 11 of the stud contains an annular groove 26 (FIGS. 1 and 5) which is defined by a cylindrical surface 27 centered about axis 12, and two annular shoulders 28 and 29 disposed transversely of axis 12 and centered thereabout. The cylindrical inner wall surface 27 of the groove is for best results of a diameter slightly less than the minor diameter of upper threads 14, and considerably less than the minor diameter of the self tapping lower threads 15.

Stop element 13 is carried about the stud body 11 at the location of groove 26, and is partially received within that groove. As seen in FIG. 2, the stop element is of a generally C-shaped cross section, transversely of axis 12, being annular about axis 12 except for the provision of an interruption 30 at one side of the stud body. More particularly, the stop element has an outer cylindrical surface 31 centered about axis 12 and interrupted at the location 30, and has an inner cylindrical surface 32 also centered about axis 12 and interrupted at 30. Surface 32 is of a diameter corresponding substantially to the diameter of external cylindrical surface 27 of stud body 11 within groove 26, and is a close fit on that surface to locate the stop element in predetermined position relative to the stud body. At its opposite axial sides, the stop element has two parallel planar side surfaces or faces 33 and 34, spaced apart a distance substantially equal to or slightly less than the axial spacing between shoulders 28 and 29, so that surfaces 33 and 34 can engage those shoulders in a manner preventing axial movement of the stop element relative to the stud body 11.

The interruption 30 is the C-shaped stop element is defined by two parallel axially extending planar surfaces 35 extending generally radially through the otherwise annular stop element (parallel to radius 36 of FIG. 2). The spacing or distance $d$ between these surfaces 35, transversely of axis 12, is slightly less than the diameter $D$ of surface 27 of the stud body within the groove, so that internal cylindrical surface 32 of the stop element extends about surface 27 of the stud body through slightly more than 180 degrees, between the points 37 and 38 of FIG. 2, with the result that the stop element must initially be forced laterally onto the stud body. To enable this forcing of the stop element onto the stud, one of these two parts, and preferably the stop element 13, is given sufficient resilience to deform slightly as the stop element is forced onto the stud body, and to then return by its own resilience to the FIG. 2 interfitting condition. That is, as the stop element 13 is forced from left to right in FIG. 2, the spacing between surfaces 35 of the stop element may be increased by engagement with surface 27 of the stud body, until the parts reach the FIG. 2 position, at which location the C-shaped stop element springs back to its FIG. 2 condition for effective retention thereafter on the stud body. Desirably, both of the parts 11 and 13 are formed of a suitable metal, such as an appropriate steel having the desired resilience, and capable of deformation as discussed without passing the elastic limit of the material.

With reference now to FIG. 5, stud body 11 is manufactured by forming a series of such bodies from an elongated piece of metal stock 39 which along its entire length has the non-circular external cross section illustrated in FIG. 6. As will be apparent from a comparison of FIGS. 3 and 6, the outer surface 21' of the stock 39 has the same cross section as the outer thread surfaces 21 of FIG. 3, to define alternate peaks and recesses 22' and 23'. The minimum radius areas 23' are recessed radially inwardly beyond planes drawn to just touch the two adjacent peaks, such as the plane 40 of FIG. 6.

In forming the stud body 11 from stock 39, threads 15 are formed on the non-circular stock by a conventional thread chaser or other thread cutting tool (139 in FIG. 5), and at a diameter such that the threads are truncated irregularly by the radially waving outer surface 21' of the stock, which surface of course then forms the outer surfaces 21 of the threads as seen in FIG. 3. The end threads 15 are chamfered by a suitable cutting tool and to the condition illustrated at 25 in FIG. 1, while the threads 11 and groove 26 are also machined on the stud body by conventional tooling. Desirably, threads 14 have a major diameter which is not greater than (and is preferably less than) the minimum diameter of threads 15 (at the recessed locations 23 and 23' of FIGS. 3 and 6), and is also not greater than and preferably less than the diameter of minor diameter surfaces 24, so that the threads 14 may be of completely conventional and standard configuration and be unaffected by the initially non-circular external cross section of the stock. After one of the stud bodies 11 has been formed from an end portion of stock 39, typically on a screw machine, and has been cut off of the stock, a next successive stud body is machined from the next portion of the stock, etc., to thus form a series of the bodies.

The stop elements 13 are forced onto the stud bodies in the manner previously discussed, following which one of the assemblies 10 may be screwed into carrier part 16 to the position of FIG. 4, with threads 15 acting to tap the mating threads 20 in the carrier part, and with the peaks 22 serving to resist unscrewing rotation of the threads 15, and thus lock the stud against removal from the FIG. 4 position. Stop element 13 engages upper surface 18 of the carrier part to accurately limit the extent to which the assembly 10 may be screwed into the carrier part, and to thus predetermine the final setting of the stud. In order to serve this installation limiting function, stop element 13 should, at a very minimum, have a peripheral portion or portions which extend radially outwardly farther than they would if the exterior of element 13 were shaped to form a true helical continuation of threads 15. Preferably, the carrier part engaging surface 34 of element 13, and outer surface 31, extend radially outwardly at least as far as the maximum diameter of peaks 22, and for best results substantially beyond that peak diameter (and beyond both the major and minor diameters of the other threads 14).

I claim:

1. A threaded stud comprising an elongated body having a first series of external threads near a first end thereof to be screwed into a passage in a coacting part, said threads of the first series having a self-tapping and self-locking externally non-circular cross-section transversely of the stud defining circularly spaced self-tapping and self-locking parts and circularly intermediate reduced radius areas, said body having a second series of external threads near the second end thereof to be connected to a second coacting part, said threads of the second series having a major diameter less than the diameter of said peaks of the first threads and having a minor diameter less than the diameter of said reduced radius areas of the first series of threads, said stud body containing an essentially annular groove in its outer surface at a location intermediate said two series of threads, an essentially C-shaped stop element formed separately from said elongated body and disposed thereabout at said location intermediate said two series of threads and received partially within said groove and projecting radially outwardly from the groove to a diameter at least as great as the maximum diameter of said peaks of the first series of threads to engage said first coacting part in a relation limiting threaded advancement of said first series of threads thereinto, said groove having an inner wall about which said stop element is disposed and of a diameter at least about as small as the minor diameter of said second series of threads, said stop element having an interruption at one side of the stud body of a width almost as great as, but slightly less than, the diameter of said inner wall of the groove, for passing the stop element onto and then retaining it on the stud body.

2. A threaded stud as recited in claim 1, in which said stop element has oppositely facing surfaces at its opposite axial sides both of which have portions within said groove which extend substantially directly transversely of a common axis of said first and second series of threads and are engageable with opposite sides of the groove in locating relation.

3. A threaded stud comprising an elongated body having a first series of external threads near a first end thereof to be screwed into a passage in a coacting part, said threads of the first series having a self-tapping and self-locking externally non-circular cross-section transversely of the stud defining circularly spaced self-tapping and self-locking peaks and circularly intermediate reduced radius areas, said body having a second series of external threads near the second end thereof to be connected to a second coacting part, said threads of the second series having a major diameter less than the diameter of said peaks of the first threads and having a minor diameter less than the diameter of said reduced radius areas of the first series of threads, said stud body containing an essentially annular groove in its outer surface at a location intermediate said two series of threads, an essentially C-shaped stop element formed separately from said elongated body and disposed thereabout at said location intermediate said two series of threads and received partially within said groove and projecting radially outwardly from the groove to a diameter greater than the maximum diameter of said peaks of the first series of threads to engage said first coacting part in a relation limiting threaded advancement of said first series of threads thereinto, said groove having an essentially cylindrical inner wall about which said stop element is disposed and of a diameter less than the minor diameter of said second series of threads, said stop element having an essentially cylindrical internal surface fitting closely about said inner wall of the groove, said stop element having an interruption at one side of the stud body of a width almost as great as, but slightly less than, the diameter of said inner wall of the groove, for passing the stop element onto and then retaining it on the stud body, said stop element having oppositely facing surfaces at its opposite axial sides both of which extend substantially directly transversely of a common axis of said first and second threads and are engageable with opposite sides of the groove in locating relation, said oppositely facing surfaces continuing radially outwardly beyond said groove and being disposed substantially directly transversely of said axis through substantially the entire radial extent of the stop element.

References Cited

UNITED STATES PATENTS

| 1,299,691 | 4/1919 | Dery | 85—8.6 |
| 2,177,452 | 10/1939 | Dempsey | 85—42 |
| 2,782,883 | 2/1957 | Rosan | 151—41.73 |
| 2,788,830 | 4/1957 | Rosan | 85—8.8 |
| 3,200,691 | 8/1965 | Neuschotz | 85—47 |

FOREIGN PATENTS 213,155  1/1961  Austria.

CARL W. TOMLIN, Primary Examiner

RAMON S. BRITTS, Assistant Examiner

U.S. Cl. X.R.

85—42, 47, 51